W. A. ROSS.
ARMORED MOTOR CAR.
APPLICATION FILED AUG. 14, 1916.
1,333,446.
Patented Mar. 9, 1920.
8 SHEETS—SHEET 1.
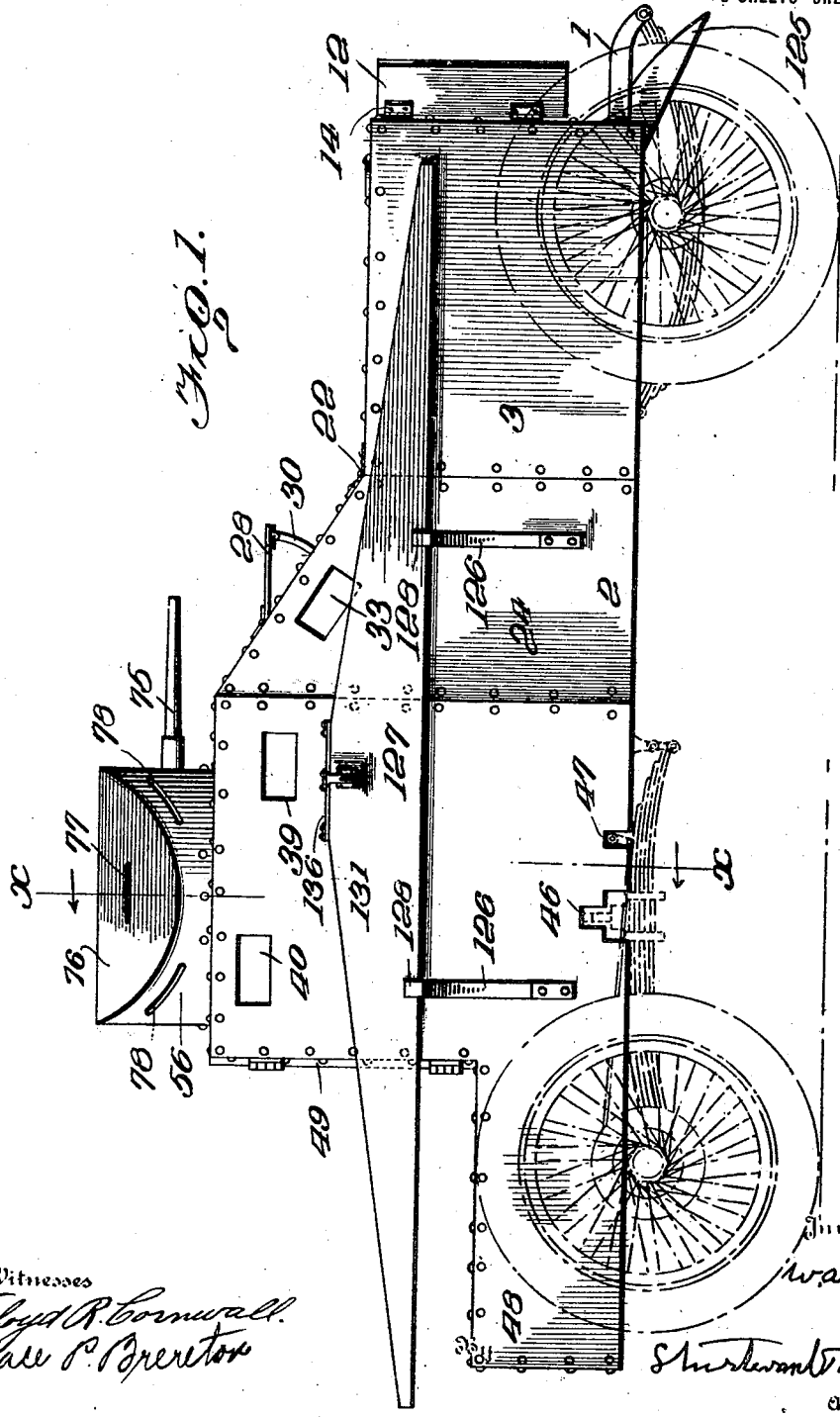

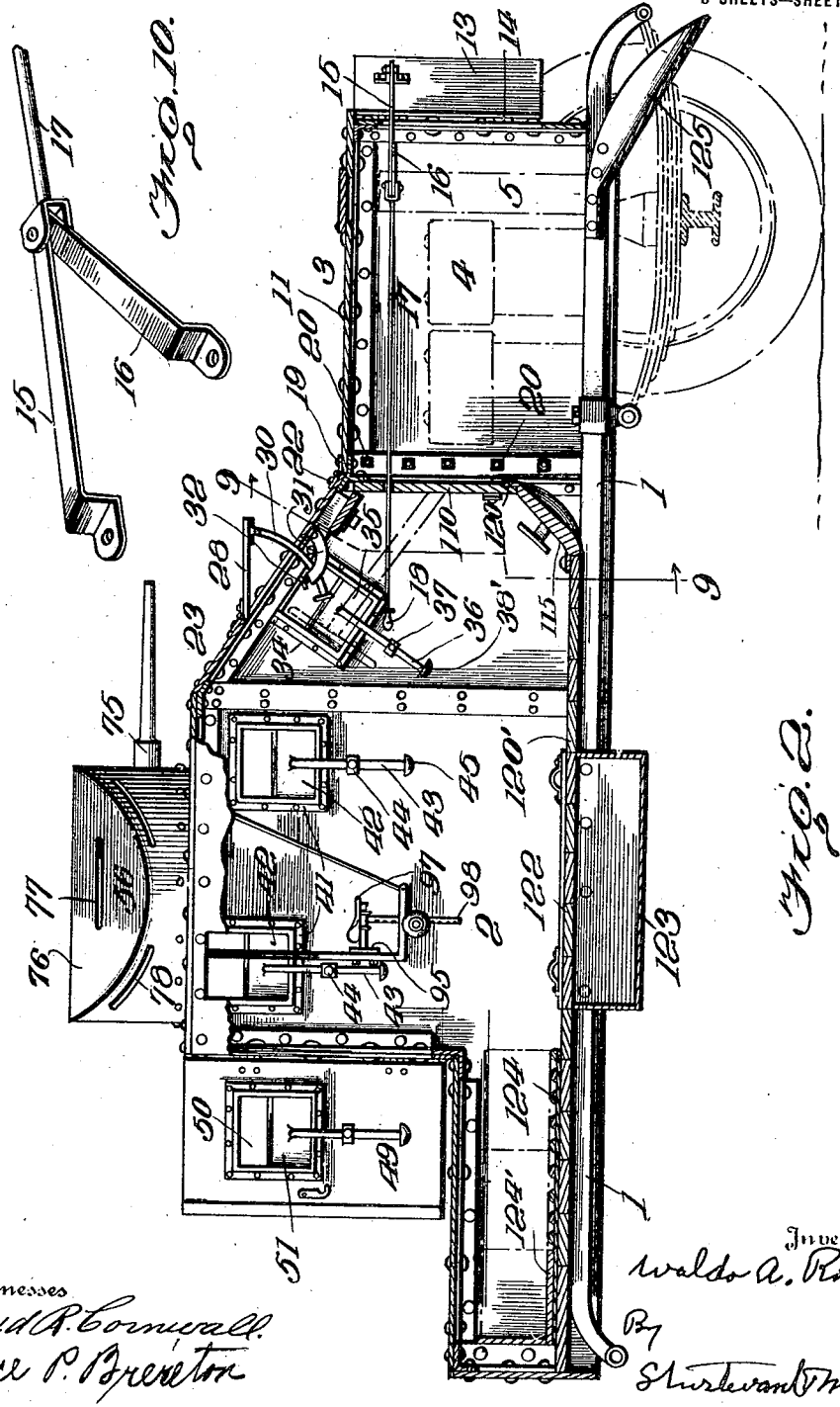

W. A. ROSS.
ARMORED MOTOR CAR.
APPLICATION FILED AUG. 14, 1916.
1,333,446.
Patented Mar. 9, 1920.
8 SHEETS—SHEET 3.
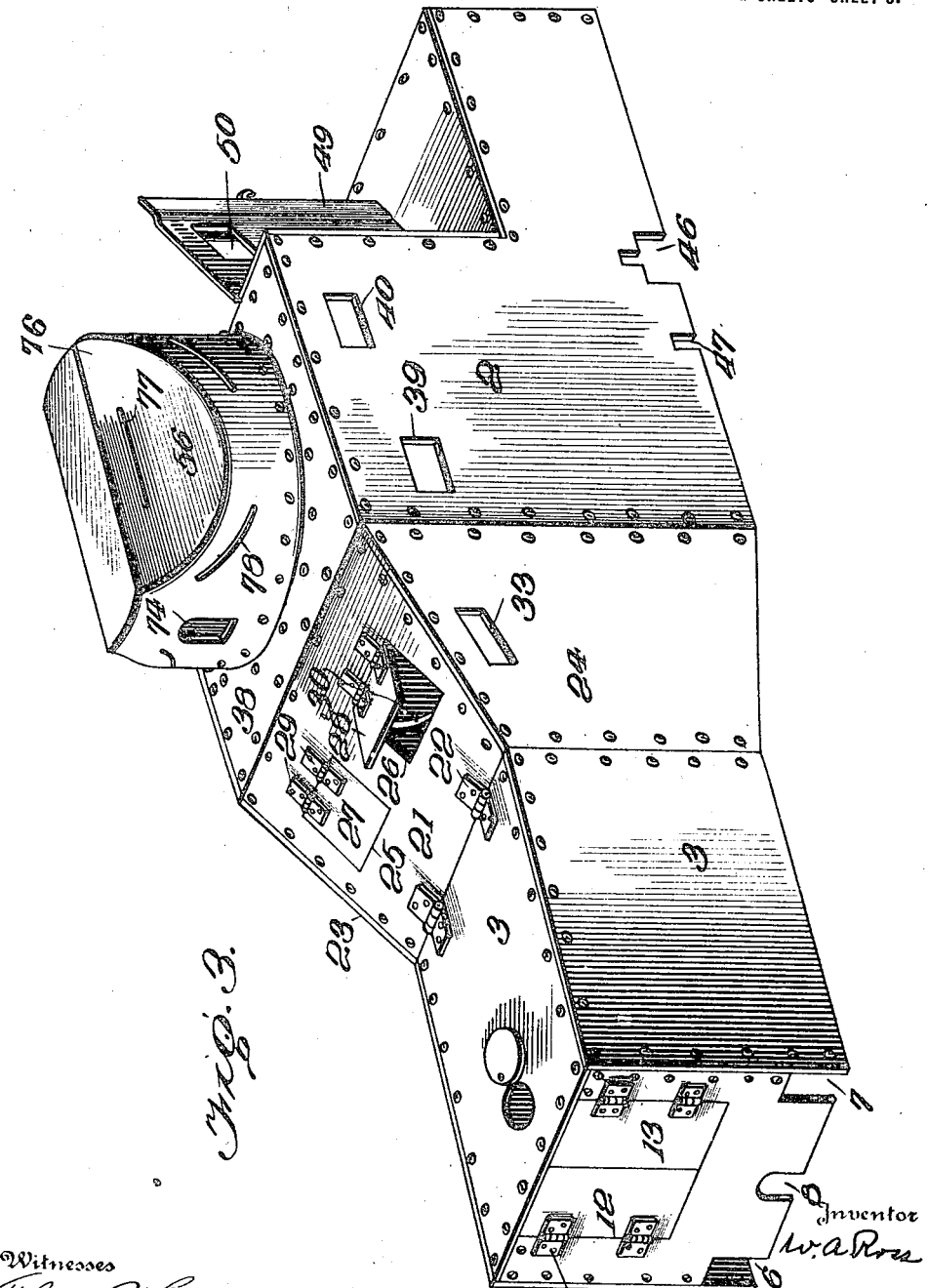

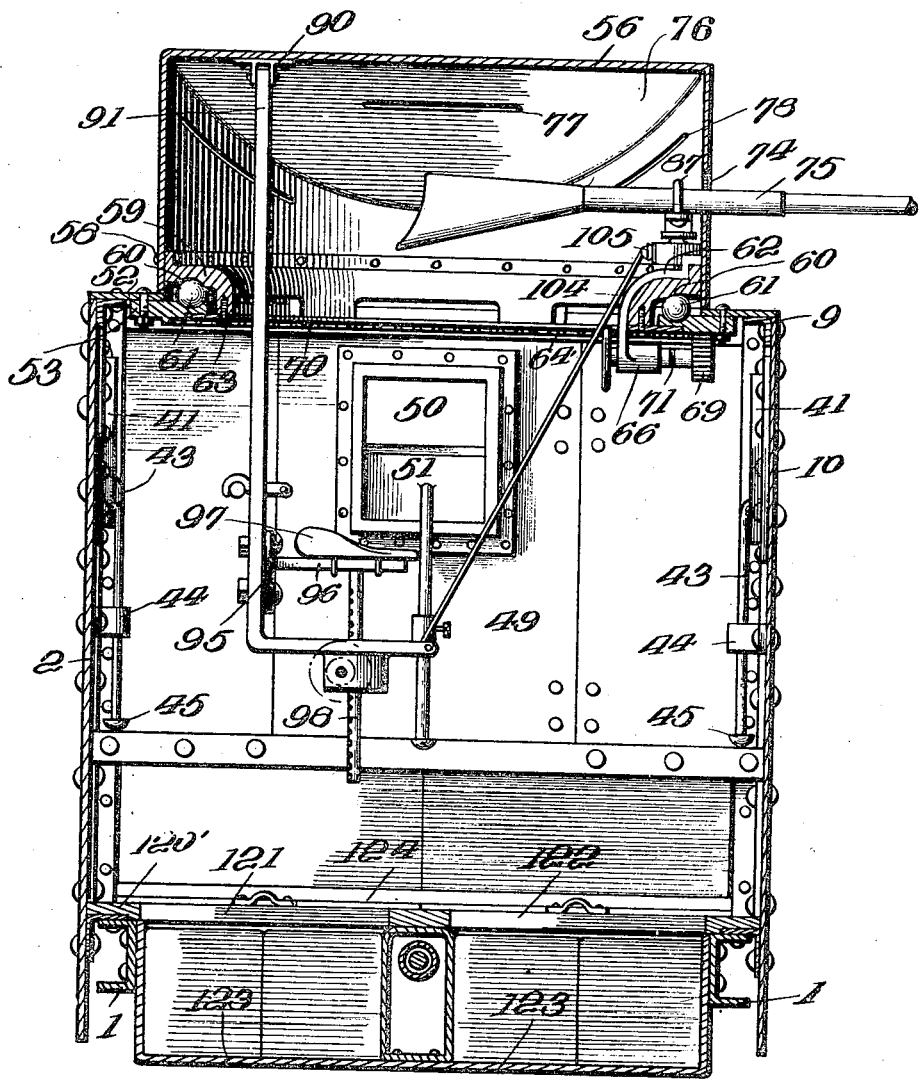

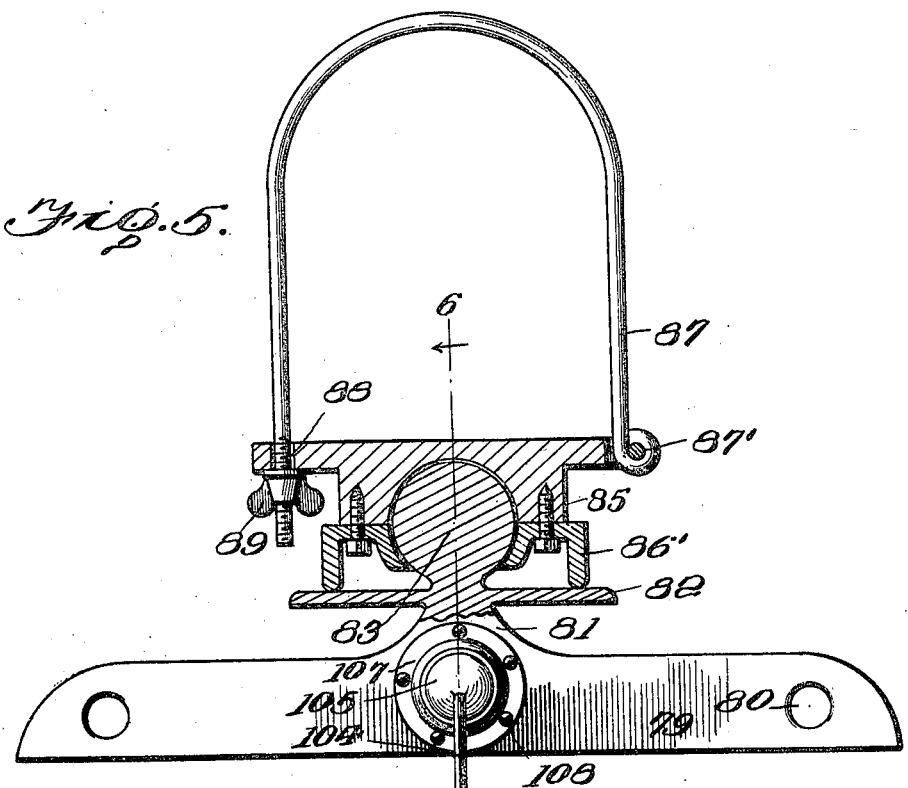
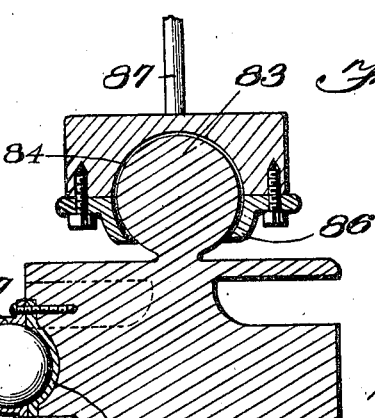

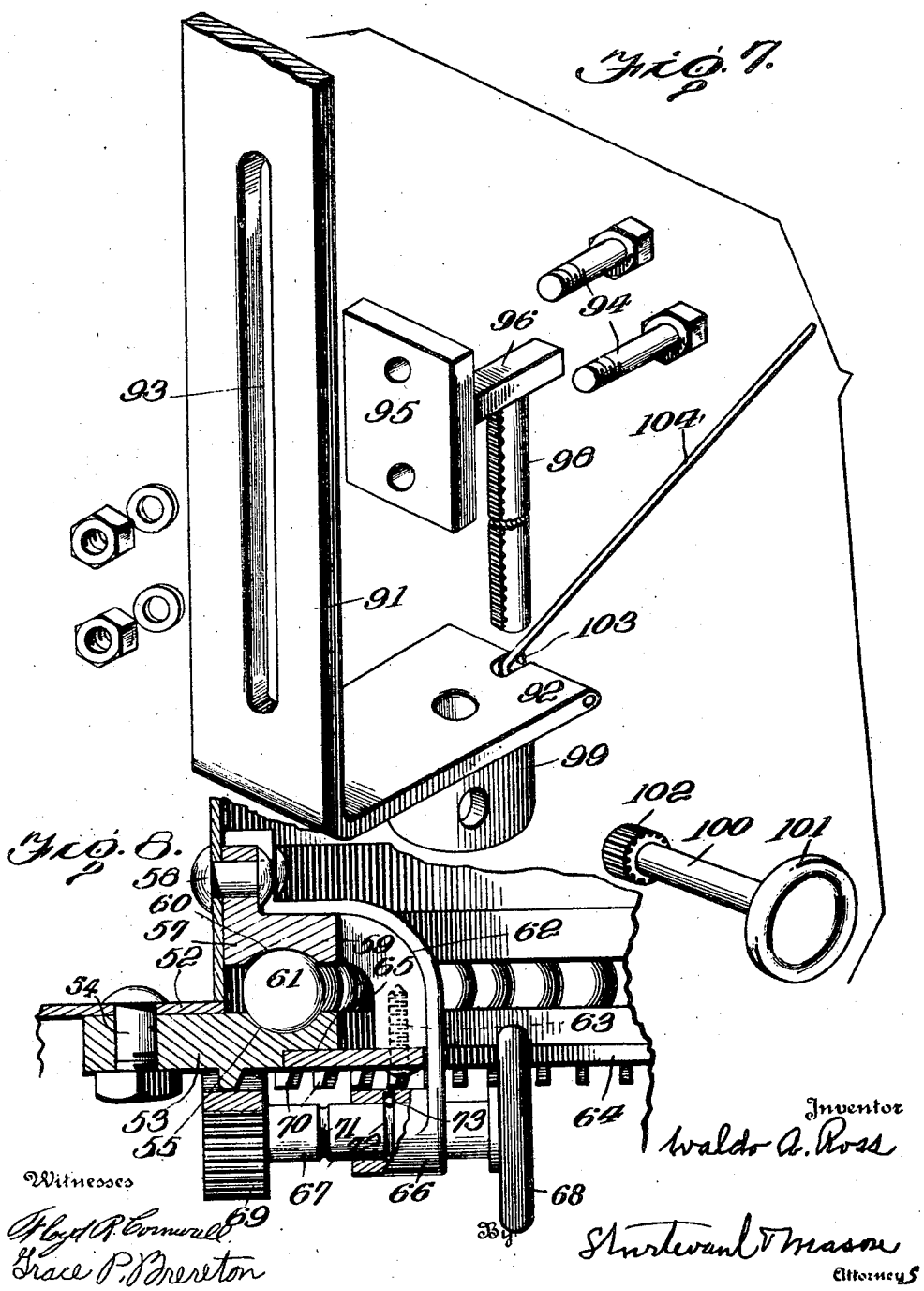

W. A. ROSS.
ARMORED MOTOR CAR.
APPLICATION FILED AUG. 14, 1916.

1,333,446.

Patented Mar. 9, 1920.
8 SHEETS—SHEET 7.

Witnesses
Floyd R. Cornwall
Grace P. Brereton

Inventor
Waldo A. Ross
By Sturtevant & Mason
Attorneys

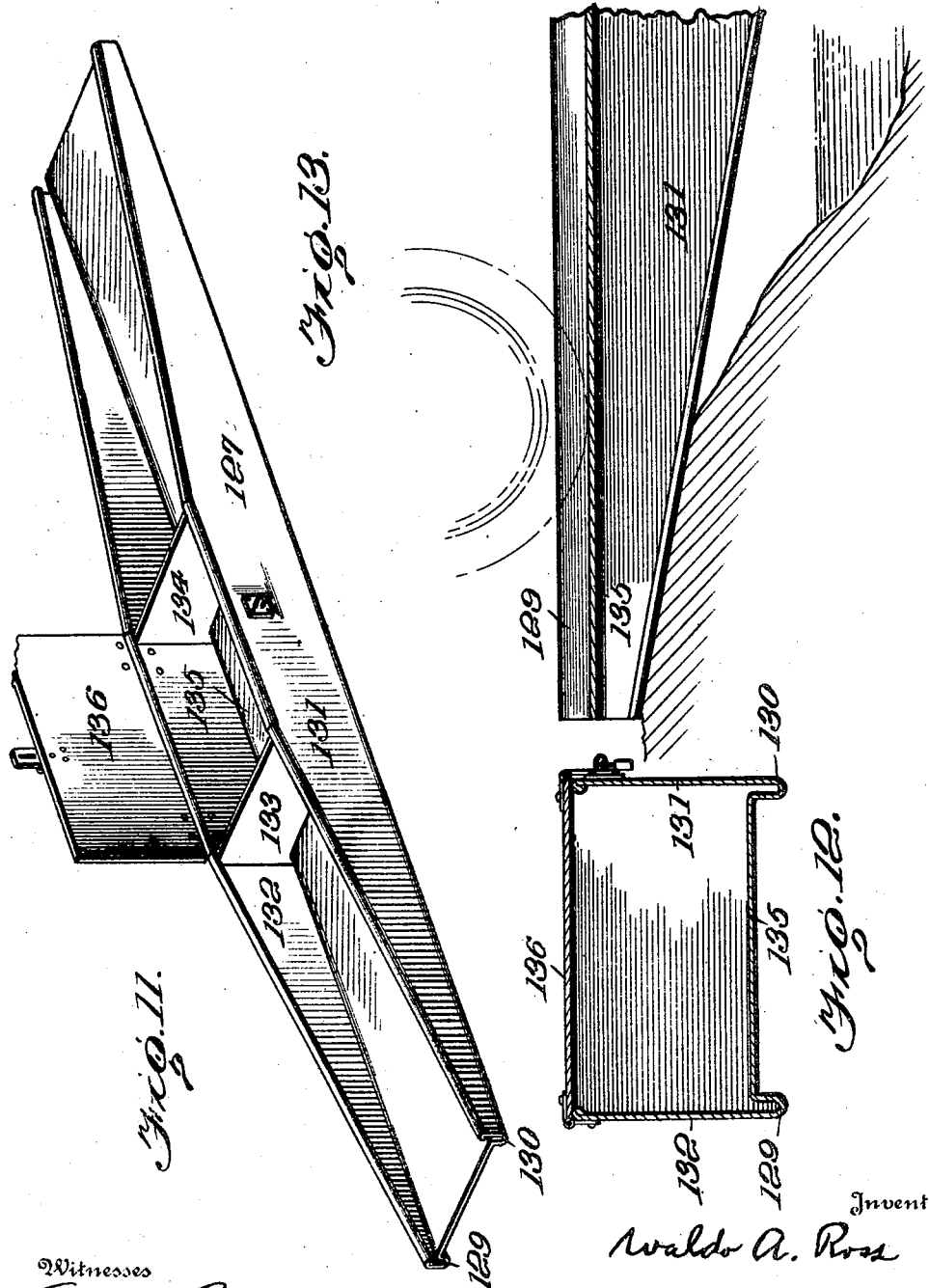

UNITED STATES PATENT OFFICE.

WALDO A. ROSS, OF SIOUX FALLS, SOUTH DAKOTA, ASSIGNOR TO THE ARMORED MOTOR CAR CO., INCORPORATED, OF DETROIT, MICHIGAN, A CORPORATION OF MICHIGAN.

ARMORED MOTOR-CAR.

1,333,446.  Specification of Letters Patent.  Patented Mar. 9, 1920.

Application filed August 14, 1916. Serial No. 114,744.

*To all whom it may concern:*

Be it known that I, WALDO A. ROSS, a citizen of the United States, residing at Sioux Falls, in the county of Minnehaha, State of South Dakota, have invented certain new and useful Improvements in Armored Motor-Cars, of which the following is a description, reference being had to the accompanying drawing and to the figures of reference marked thereon.

My invention relates to new and useful improvements in armored motor cars.

An object of my invention is to provide a motor car of this character in which an armored housing is so constructed that it can be placed upon the chassis of the ordinary motor vehicle and fully protect the working parts of the car and also the driver and the gunner.

Another object of my invention is to provide a motor car of this character in which a revolving turret having a gun mounted therein is so arranged that the gun can be pointed in any direction and having a seat so mounted in the turret that the operator of the gun, sitting on the seat will be in a line with the gun, no matter in which direction the gun is pointed and the car is tilted.

A further object of my invention is to provide a light, cheap and effective armored car of this character having certain details of structure and operation and combination of parts hereinafter more fully described.

In the accompanying drawings:—

Figure 1 is a side elevation of my armored housing applied to the chassis of the ordinary motor car;

Fig. 2 is a vertical longitudinal sectional view of Fig. 1;

Fig. 3 is a perspective view of the armored housing removed from the chassis;

Fig. 4 is a transverse vertical sectional view taken on the line x—x, Fig. 1, looking toward the rear, with the turret turned so that the gun is pointed to the side of the car;

Fig. 5 is a side elevation partly in section of the gun mount;

Fig. 6 is a vertical sectional view taken on the line 6—6, Fig. 5;

Fig. 7 is an enlarged perspective view of the seat support, showing the several parts in their separated relation;

Fig. 8 is an enlarged vertical sectional view of the lower end of the turret showing the ball bearings for rotatably supporting it upon the armored housing and also showing the means for rotating the turret and holding it in its adjusted position;

Fig. 10 is a perspective view of the levers for operating the doors at the forward end of the housing;

Fig. 11 is a perspective view of the combined runway, tool box and bridge;

Fig. 12 is a transverse sectional view taken through the tool box; and

Fig. 13 is a vertical longitudinal sectional view, showing the runway used as a bridge.

Figure 9:
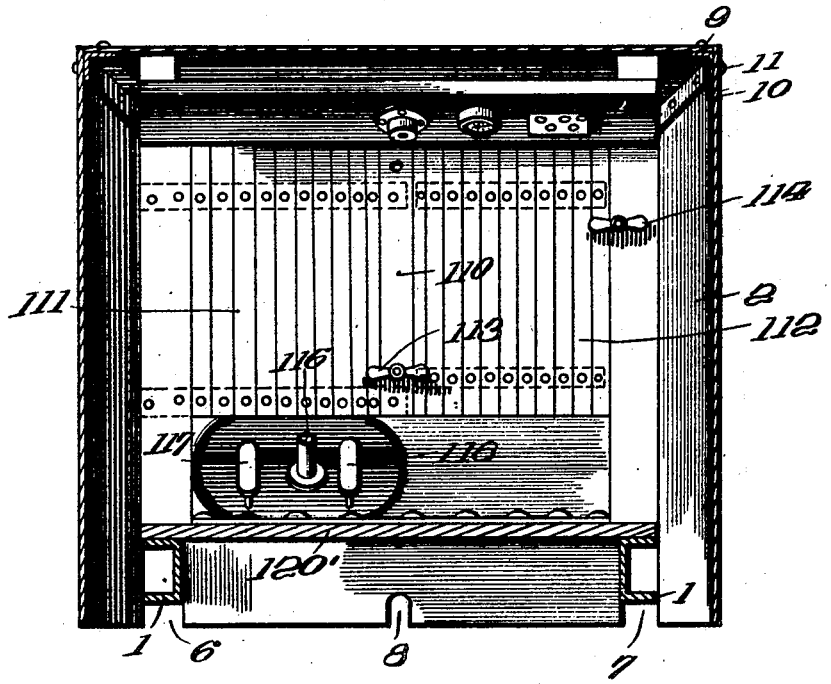
Fig. 9 is a vertical sectional view taken on the line 9—9, Fig. 2, and looking forward.

Referring now to the drawings, 1 represents the chassis of the ordinary motor car and 2 represents the armored housing which as shown, rests directly upon the chassis and, therefore, is adapted to be readily placed upon or removed from the chassis and yet rigidly supported. The armored housing as clearly shown in Fig. 3 of the drawings, consists of a forward reduced portion 3 which extends over the engine 4 and radiator 5 and is provided at its forward end adjacent each side with the cutaway portions 6 and 7 which are adapted to receive the forward extension of the chassis 1 and whereby the sides of the housing extend far enough down to protect all of the working parts of the motor car. The forward end of the housing is also provided with a cutaway portion 8 to allow the crank to extend forward for cranking the engine. The housing as clearly shown in the several figures is made of angle irons 9 having the armor plates 10 riveted thereto by the rivets 11 whereby the same is greatly strengthened allowing the use of a lighter armor plate and adding stability to the housing. The forward end of the portion 3 of the housing covering the engine and radiator is provided with two doors 12 and 13 hinged at 14 and having pivotally connected to their inner faces, the links 15 and 16. Pivotally connected to the inner ends of the links 15 and 16 is a rod 17 which extends rearwardly through the dash board and provided with a handle 18 whereby the doors may be opened and closed, at will by the operator of the car, as will be later described.

The frame 3 is secured to the angle iron 19 by bolts 20 so that they can be removed and the frame 3 is hinged to the slanting armor plate 21 by means of the hinges 22. By this structure it will be seen that the frame 3 can be swung upwardly so that access may be had to the engine.

Secured to the angle irons are the two slanting side walls 23 and 24 which spread outwardly and form the slanting body portion in which the operator of the car sits, and owing to the slanting walls of the armor plate, the bullets will be deflected, requiring lighter armor plate. The upper slanting armor plate 21 is provided with two windows 25 and 26 which are closed by the hinged doors or shutters 27 and 28, hinged at 29 and 30 at their upper ends. The windows 25 and 26 are in a horizontal alinement with the head of the operator of the car, whereby he can see to operate the same. Secured to the underside of the doors 27 and 28 are segmental bars 30 which pass through openings in the bracket 31 and held in their adjusted position by means of set screws 32 whereby the doors may be held closed or open or in any adjusted position, as fully shown in Fig. 2 of the drawings. The side plates 23 and 24 are provided with windows 33 which are surrounded on the inside by guideways 34 in which are mounted the shutters 35. The shutters 35 have secured thereto the rods 36 which pass downwardly through guides 37 and are provided with handles 38' whereby the shutters may be opened or closed as desired.

The plates 21, 23 and 24 are riveted to angle irons and have their rear ends riveted to the angle irons of the main center portion 38 of the housing. This main center portion 38 is of a rectangular form and is provided on each side with two windows 39 and 40. The windows 39 are approximately in a horizontal alinement with the windows 25 and 26 so that the operator of the car can see to the side and rear. The windows 40 are in a line slightly above, so that the occupants of the car can see to the side. The windows 39 and 40 are surrounded by guideways 41 secured to the inner faces of the plates and in which are slidably mounted the shutters 42 to which are secured the rods 43 passing through guides 44 and provided with handles 45 and whereby the shutters may be opened or closed as desired.

The lower ends of the side plates of the central body portion 38 are provided with cutaway portions 46 and 47 which provide for the rear spring connections which extend outwardly beyond the sides of the chassis as is well understood and as clearly shown in Fig. 1 of the drawings. The rear end of the central body portion 38 is provided with a rearwardly extending housing 48 which is of a height considerably less than that of the main body portion and like the remainder of the housing is formed of armor plates riveted or bolted to angle irons and serves as a platform and also as the ammunition compartment, as shown in Fig. 2 of the drawing and which will be hereinafter more fully described.

The rear vertical wall of the central body portion is provided with a doorway closed by the door 49 and said door is provided with the window 50 which is closed by the shutter 51 which is mounted in the guideways, and operated in the same manner as the shutters heretofore described.

The top plate 52 of the main or central portion 38 of the housing is provided with a round opening and bolted to the underside of the plate 52 and extending in beyond the opening is a circular steel ring 53 held by the bolts 54. The said ring is provided in its upper face with a semicircular ball race 55. The turret 56 is of cylindrical form and of a diameter slightly greater than the opening and has secured to its lower end a circular angle iron 57 secured by rivets 58. The horizontal flange 59 of the angle iron has in its lower face the ball race 60 and resting in the ball races 55 and 60 are the balls 61 whereby the turret may be readily oscillated or revolved on the housing. The horizontal flange of the angle iron at desired intervals is provided with downwardly curved arms 62 which have secured by means of screw bolts 63 the ring 64. The outer upper face of the ring enters a cutaway portion 65 in the ring 53 whereby the turret is held against upward movement and also against lateral movement as is clearly shown in Fig. 8 of the drawings.

One of the curved arms 62 is provided at its lower end with an enlarged bushing 66 forming a bearing in which is rotatably mounted the shaft 67. The inner end of the shaft has a hand wheel 68 by means of which it can be rotated and the opposite end is provided with a pinion 69 meshing with the teeth 70 carried by the lower face of the ring 53 and whereby the rotation of the shaft 67 will cause the turret to revolve. The shaft 67 is longitudinally movable in the bushing 66 whereby the pinion 69 can be moved in or out of engagement with the teeth 70. In order to hold the shaft in its inward or outward position I provide the shaft with two grooves 71 and 72 which extend around the shaft and the bushing 66 is provided with a spring pressed ball 73 which enters the grooves 71 and 72 and is adapted to hold the shaft 67 with the pinion 69 in or out of engagement with the teeth 70.

The turret 56 is of a cylindrical form and has in its side an opening 74 through which the gun 75 extends. The top of the turret has the slanting walls 76 provided with elongated openings 77 whereby the gunner can see to the side. The vertical wall of the turret is provided with four curved slots 78 which form windows so that the gunner can look in any direction.

The gun support consists of an elongated curved plate 79 adapted to correspond with the curve of the turret and bolted thereto by means of the holes 80. The plate at its center is provided with an upwardly extending portion 81 having a flat horizontally arranged disk 82 at its upper end. The said disk at the center, is provided with a raised ball 83 and said ball enters a socket 84 in the lower face of the enlarged plate 85. Surrounding the socket and secured to the lower face of the plate 85 is a ring 86 which surrounds the ball and prevents the upward movement of the plate yet allows the free oscillation thereof. The ring 86 is provided with downwardly extending lugs 86' on opposite sides which engage the plate 82 and prevent the gun rest from rocking in one direction, this direction being at right angles to the direction the gun points.

The plate 85 has a loop 87 pivoted at one side at 87' and its opposite end passing through the opening 88 has a thumb 89 screwed thereon below the plate whereby the gun can be tightly clamped upon the plate 85.

The upper end of the turret has downwardly extending ears 90 between which is pivoted the seat supporting bar 91 which has at its lower end the laterally turned portion 92. The bar 91 is provided with an elongated slot 93 through which pass the bolts 94 by means of which the plate 95 is adjustably secured to the bar. The plate 95 has secured thereto a horizontal bar 96 upon which is secured the seat 97 for the gunner and the said bar is provided with a downwardly extending rack bar 98. The rack bar 98 passes downwardly through an opening in the laterally turned portion 92 of the bar 91 and also through the cylindrical boss 99 carried by the lower face of the portion 92. Extending transversely through the boss 99 at one side of the center is a shaft 100 which has at one end an operating wheel 101 and at the opposite end a pinion wheel 102 which meshes with the rack bar 98 and whereby the seat may be raised or lowered as desired, upon the loosening of the nuts on the bolts 94.

The outer end of the laterally turned portion 92 of the bar 91 is provided with a slot 103 in which is pivoted the rod 104 which extends obliquely upwardly and provided with ball 105 which enters the socket 106 in the plate 79. The ball 105 is held in the socket by the curved plate 107 which is secured to the plate 79 by means of the screws 108.

From the foregoing description it will be apparent that the bar 91 swings upon its pivot in a direction at right angles to the direction the gun is at all times pointed, with respect to the turret, and whereby the gunner is at all times sitting in a vertical position with respect to the gun. The rod 104 prevents the movement of the seat in a line with the pointing direction of the gun 75 and, therefore, the position of the gunner with respect to the longitudinal axis of the gun is at all times vertical.

The angle iron 19 between the housing 3 and the slanting portion has a central wooden piece 110 secured thereto and on each side thereof are doors 111 and 112 which rest against the angle irons and are held in place against inward movement by means of the buttons 113 and 114 whereby the heat from the engine is prevented from entering the car and yet the doors can be opened so that access may be had to the engine from within the car. The foot board 115 is made of metal and has openings through which the steering column 116, the clutch lever 117 and the brake lever 118 pass and is secured to the floor 119 of the car. The upper edge of the foot board 115 is cut away as indicated at 120 to receive the doors 111 and 112 to prevent the forward movement of the lower ends of the doors.

The floor 120' of the car has two trap doors 121 and 122 opening into the ammunition box 123, which is secured to the chassis 1, as is fully shown in Fig. 4 of the drawings. The ammunition box is provided with a central passage therethrough, through which the drive shaft of the engine projects.

The rear end of the car forms the ammunition receptacle communicating with the interior of the car and has in its rear end a frame 124' the width of one ammunition box and has secured to its front edge a tape 124 upon which the other ammunition receptacles rest. By pulling the tape the frame is pulled out carrying with it the frame 124' and the boxes of ammunition and the tape is rolled up as the ammunition boxes are removed.

The side of the housing is provided with brackets 126 on which rests the runway 127, said runway being held against outward movement by means of the upwardly turned ends 128. This runway is made of sheet metal, being formed with the doubled portions 129 and 130 forming the flanges on the lower face. The doubled portions extend upwardly and form the sides 131 and 132 which taper toward the ends. At the center between the sides are partitions 133 and 134 which form a tool box 135 having the cover 136 closing the same. This runway forms a tool box and also means for transporting other articles which may be placed on the runway at either end beyond the tool box. The runway is removable and is adapted to be used as a bridge as shown in Fig. 13 of the drawings. When removed and used as a bridge it will be seen that it is inverted and the sides 131 and 132 strengthen it and the doubled portions 129 and 130 serve as flanges to prevent the car from running off the same.

In order to supply the radiator 5 with air when the doors 12 and 13 are closed, I provide a scoop shaped plate 125 which is secured to the chassis and extends downwardly and forwardly beyond the housing as shown in Fig. 2 of the drawings.

From the foregoing description it will be seen that applicant has produced a motor car in which all of the working parts are protected by the armored housing and in which the operator of the car is protected and can see in any direction. The housing and turrets are so arranged that the gun can be pointed in any direction by revolving the turret and the gunner's seat assumes the same position at all times with respect to the gun, no matter in which direction the turret is turned or in which direction the car is tilted as the seat cannot swing toward the gun; that is, forward movement and rearward movement of the seat being prevented and if the car tilts, as for example, by the wheels running into a rut, the seat moves vertically to correspond.

Having thus described my invention, what I claim as new and desire to secure by Letters Patent, is:—

1. In an armored car of the character described, the combination with the chassis of a motor vehicle having the usual axles and side frames, of an armored housing supported by the chassis, a rotatable turret supported by the housing and a gun supported within the turret and bodily movable therewith and a seat supported by the turret, said seat being supported to swing laterally with respect to the longitudinal axis of the gun.

2. In an armored car of the character described, the combination with the chassis of a motor vehicle, of an armored housing supported by the chassis, a rotatable turret supported by the housing, a gun supported by the turret, and a swinging seat supported by the turret and adapted to swing at right angles to the gun.

3. In an armored car of the character described, the combination with the chassis of a motor vehicle, of an armored housing supported by the chassis, a rotatable turret supported by the housing, a swiveled gun supported by the turret, and a swinging seat supported by the turret and adapted to swing at right angles to the gun.

4. In an armored car of the character described, the combination with a housing, a turret rotatably mounted on the housing, a gun supported by the turret, and a seat supported by the turret and adapted to swing at right angles to the gun.

5. In an armored car of the character described, the combination with a housing, a turret rotatably mounted on the housing, a gun movably supported by the turret, and a swinging seat supported by the turret and adapted to swing at right angles to the gun.

6. In an armored car of the character described, the combination with a housing, a turret rotatably supported on the housing, a gun movably supported by the turret, a swinging seat supported by the turret to swing at right angles to the gun, means for vertically adjusting said seat, and means for preventing the seat from swinging to or from the gun.

7. In an armored car of the character described the combination with a chassis of a motor vehicle, of a housing formed of angle iron and armor plate formed with a reduced forward end covering the engine and radiator, and diverging walls extending therefrom forming the driver's compartment, an enlarged body portion in rear thereof and forming the gun carrying portion, and a reduced rear end forming the ammunition compartment in communication with the body portion, the top in said ammunition compartment forming a platform and with doors opening into the driver's compartment from the rear.

8. In an armored car of the character described, the combination with the chassis of a motor vehicle, of a housing formed with the reduced forward end covering the engine and radiator and having doors in its forward end, and diverging walls extending therefrom forming the driver's compartment, removable doors closing the communication between the engine compartment and the driver's compartment, windows in said diverging walls, shutters closing the windows, a rectangular body portion in rear of the diverging walls and in communication with the driver's compartment, a gun turret carried by the upper end of the body portion, a door at the rear end of the body portion and a reduced end below the door of the body portion and in communication with the body portion for holding the ammunition and forming a platform.

9. In an armored motor car, the combination with the chassis of a motor vehicle, an armored housing supported by the chassis, a revolving gun turret supported thereby, a pinion carried by the turret, means for rotating said pinion, a rack carried by the housing and meshing with the pinion whereby the turret is rotated and means for moving the pinion in or out of engagement with the rack bar.

10. In an armored motor car, the combination with the chassis of a motor vehicle, an armored housing mounted thereon, a turret rotatably supported by the housing, a plate secured to the turret, a ball carried by the plate, a gun mount having a socket to receive the ball, and means for preventing the rocking movement of the mount at right angles to the line of the gun carried by the mount.

11. A gun mount comprising a base, an upwardly extending central portion, a disk carried by the central portion, a ball carried by the center of the disk, a gun support having a socket receiving the ball, downwardly extending ears carried by two opposite sides of the support for engaging the disk and means for securing the gun on the gun support.

12. A gun mount comprising a base, an upwardly extending central portion, a disk covered by said portion, a ball carried by the center of the disk, a gun support having a socket receiving the ball, downwardly extending ears carried by two opposite sides of the support and engaging the disk, and a loop pivoted to one side of the support and having removable adjustable means for attaching it to the opposite side for securing the gun to the support.

13. In an armored car of the character described, the combination with the chassis of the motor vehicle, of a housing having a reduced forward end covering the engine and terminating in diverging walls forming the driver's compartment, an enlarged body portion connected to the diverging walls, a rotatable gun carrying turret mounted on the top of the body portion, a reduced rear end forming a platform and ammunition compartment in communication with the body portion, and the body having a door in the rear wall above the platform.

14. In an armored motor car, the combination with the chassis of a motor vehicle, an armored housing mounted thereon, a revolving turret mounted on the housing, a gun mounted on the turret, a swinging seat support carried by the turret, a seat carried by the support, a rod connected to the seat support and to the turret directly below the gun, and means for adjusting the seat.

15. In an armored motor car the combination with the chassis of a motor vehicle, an armored housing having a forward portion inclosing the engine, doors closing the front of said forward end, a slanting driver's compartment in rear thereof and hinged thereto, swinging sliding shutters closing the windows of said compartment, removable doors between the engine housing and the driver's compartment, a main body portion in communication with the driver's compartment, a turret rotatably mounted on the body portion, a gun mounted in said turret, said turret having small slots forming windows, a reduced rear portion communicating with the body portion and forming an ammunition compartment and a platform, a door in the body portion above the platform and ammunition compartments below the body portions and removable trap doors in the floor above the ammunition compartments.

16. In an armored car the combination with the chassis of a motor vehicle, of an armored housing supported by the chassis and having a circular opening in the upper end, a ring secured to the lower face of the housing and in beyond the edge of the opening and having a ball race, a turret covering the opening, an angle iron secured to the inner face of the turret and having a ball race, balls in said races and supporting the turret, downwardly extending arms carried by the angle iron arranged at the desired intervals, a plate secured to the lower end of the arms and entering a cutaway portion in the lower face of the ring to prevent the upward and lateral movement of the turret, a boss carried by one of said arms, a shaft mounted in said boss, a pinion carried by the outer end of the shaft, teeth carried by the ring and engaging the ring, and means whereby the shaft is rotated.

17. In an armored motor car, the combination with the chassis of a motor vehicle, of an armored housing mounted thereon, a revolving turret mounted on the housing, a gun movably mounted in the turret, a seat support having its upper end pivoted to the top of the turret, a laterally extending portion carried by the lower end of the support, a plate adjustable on the vertical portion of the support, a horizontal seat support rod, a seat on said rod, a rack bar carried by the rod and extending through the laterally turned end of the support, a shaft carried by the support and a pinion carried by the shaft and meshing with the rack.

In testimony whereof, I affix my signature in the presence of two witnesses.

WALDO A. ROSS.

Witnesses:
 F. A. GADDESS,
 R. M. KELLY.